United States Patent
Eastman, II (12) 
(10) Patent No.: US 6,941,961 B1
(45) Date of Patent: Sep. 13, 2005

(54) OUTDOOR ENCLOSURE WITH SCENT-DAMPENING LINER

(76) Inventor: Robert Eastman, II, c/o Eastman Outdoors, P.O. Box 380, Flushing, MI (US) 48433

( * ) Notice: Subject to any disclaimer, the term of this patent is extended or adjusted under 35 U.S.C. 154(b) by 665 days.

(21) Appl. No.: 09/595,943

(22) Filed: Jun. 16, 2000

(51) Int. Cl.$^7$ ............................................. E04H 15/34
(52) U.S. Cl. ...................... 135/121; 135/901
(58) Field of Search ............... 135/901, 121, 135/124, 143, 122, 147, 900; 43/1

(56) References Cited

U.S. PATENT DOCUMENTS

| | | | |
|---|---|---|---|
| 3,709,237 A * | 1/1973 | Smith | 135/143 |
| 3,810,482 A * | 5/1974 | Beavers | 135/143 |
| 4,067,346 A * | 1/1978 | Husted | 135/143 |
| 5,379,786 A * | 1/1995 | Lynam | 135/87 |
| 5,439,018 A * | 8/1995 | Tsai | 135/143 |
| 5,539,930 A | 7/1996 | Sesselmann | |
| 5,585,107 A | 12/1996 | Vickers | |
| 5,628,338 A * | 5/1997 | Stumbo | 135/147 |
| 5,675,838 A * | 10/1997 | Hollinger | 2/69 |
| 5,678,247 A | 10/1997 | Vickers | |
| 5,845,957 A * | 12/1998 | Hurst | 296/100.12 |
| 5,860,391 A * | 1/1999 | Maxwell | 119/173 |
| 5,865,355 A * | 2/1999 | Camara | 135/143 |
| 5,899,519 A * | 5/1999 | Doshi | 296/39.2 |
| 5,908,043 A * | 6/1999 | Paes et al. | 135/139 |
| 5,983,913 A | 11/1999 | Fargason | |
| 6,009,673 A | 1/2000 | Adams | |
| 6,021,794 A * | 2/2000 | Guerra | 135/95 |
| 6,253,777 B1 * | 7/2001 | Anderson | 135/115 |

OTHER PUBLICATIONS

Scentblocker Carbon Blast; "President's Message", Robinson Outdoors, Inc www.robinsonlabs.com Website Viewed 2003.*

* cited by examiner

Primary Examiner—Janet M. Wilkens
(74) Attorney, Agent, or Firm—Carrier, Blackman & Associates, P.C.; William D. Blackman; Joseph P. Carrier (57) ABSTRACT

A portable hunting blind or enclosure, to provide cover to a hunter or naturalist in the field, is provided with a scent-dampening liner. An enclosure includes at least one wall, and a lining material disposed on a surface thereof. In a first illustrative embodiment, the lining material includes a binder and a multiplicity of carbon particles interspersed in the binder. The liner may be directly affixed to an inner wall surface. Alternatively, the lining material may be affixed to a separate fabric surface, which is attached to the inner wall. The enclosure may include screen panel sections pivotally connected in a sequence. Alternatively, the enclosure may be a tent-like structure which is formed of flexible fabric and includes a roof section and a support structure.

22 Claims, 4 Drawing Sheets

OUTDOOR ENCLOSURE WITH SCENT-DAMPENING LINER

BACKGROUND OF THE INVENTION

1. Field of the Invention

The present invention relates to portable shelters and similar outdoor enclosures, for providing a hidden location for a hunter or naturalist to occupy in the field, while observing or waiting for game or other wildlife. More particularly, the present invention relates to a hunting blind, shelter or similar outdoor enclosure having a scent-dampening liner therein.

2. Description of the Background Art

When out in the field for moderate or long periods, hunters often spend time in hunting blinds to disguise themselves from game, and also to protect themselves from inclement weather. However, a problem arises when a blind is used for more than a short time, because the scent of humans may be associated with the structure. It is well known that wild animals have the ability to recognize human scent as alien to their normal surroundings. When a wild animal detects human scent, the animal is apt to quickly depart and leave the area where it detects such a scent. It will be appreciated that this result will be displeasing to the hunter.

Similarly, naturalists, nature photographers, and environmental scientists often work out in the field, such as in forest or wilderness areas. Naturalists often wish to approach wild animals as closely as possible without being detected, in order to photograph or observe the animals in their natural habitat, while disturbing them as little as possible. Accordingly, these people also find it useful to mask their scent as much as feasible.

Many designs for hunting blinds are known. Class 135, subclass 900 is provided in the U.S. Patent Classification System for the listing of hunting blinds and ice-fishing shelters.

Fargason, U.S. Pat. No. 5,983,913 discloses a hunting blind with a small vent hole near ground level, and a flexible tube extending from the top of the shelter to a point approximately 30 feet from the ground. According to the teaching of the patent specification of this reference, when the wind contacts this shelter, the wind speed will be higher at the top of the shelter than it will be at ground level, where the vent is located. Also according to the theory of the Fargason reference, this wind speed differential will have a tendency to move air in through the vent hole, upwardly through the shelter, and out of the top of the flexible tube, thereby removing any scent of human shelter occupants to an area 30 feet above ground level, where it will not be detected by nearby game outside of the shelter.

Adams, U.S. Pat. No. 6,009,673 discloses a portable insulated modular shelter, which is usable as a hunting blind, ice fishing shelter, or wildlife observatory. Several other known designs for hunting blinds, ice fishing shelters and similar enclosures are referred to and discussed in the background section of the Adams '673 reference.

Some specialized clothing and quilted material, which has scent-absorbing features, is known, such as that disclosed in U.S. Pat. Nos. 5,539,930, 5,585,107, 5,678,247, 5,891,391 and 5,706,535.

Although the known devices are useful for their intended purposes, a need still exists in the art for an improved method of dampening the natural scent of humans in a hunting blind. A need also exists for an outdoor blind or concealing cover having scent-dampening properties.

SUMMARY OF THE INVENTION

The present invention provides a portable hunting blind or similar enclosure, to provide concealing cover to a hunter in the field. An enclosure according to the present invention includes a scent-dampening liner on the interior thereof.

An enclosure according to the present invention includes at least one wall, and further includes a lining material disposed on a surface of the wall. The lining material includes a binder and a multiplicity of carbon particles interspersed in the binder. The lining material may be sprayed on or otherwise attached to an interior surface of the wall. Alternatively, the lining material may be affixed to a surface of a fabric, which is attached to the inner wall surface.

In one particular embodiment of the invention, the enclosure includes a plurality of screen panel sections pivotally connected in a sequence.

In another embodiment of the invention, the enclosure may be a tent-like structure formed of flexible fabric and including a roof section and a fabric support structure, such as resiliently flexible poles or the like.

In yet another embodiment of the invention, the enclosure may have solid walls with a liner attached to an interior surface of one or more of the walls.

Accordingly, it is an object of the present invention to provide a portable hunting blind or similar enclosure having a scent-dampening liner therein.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
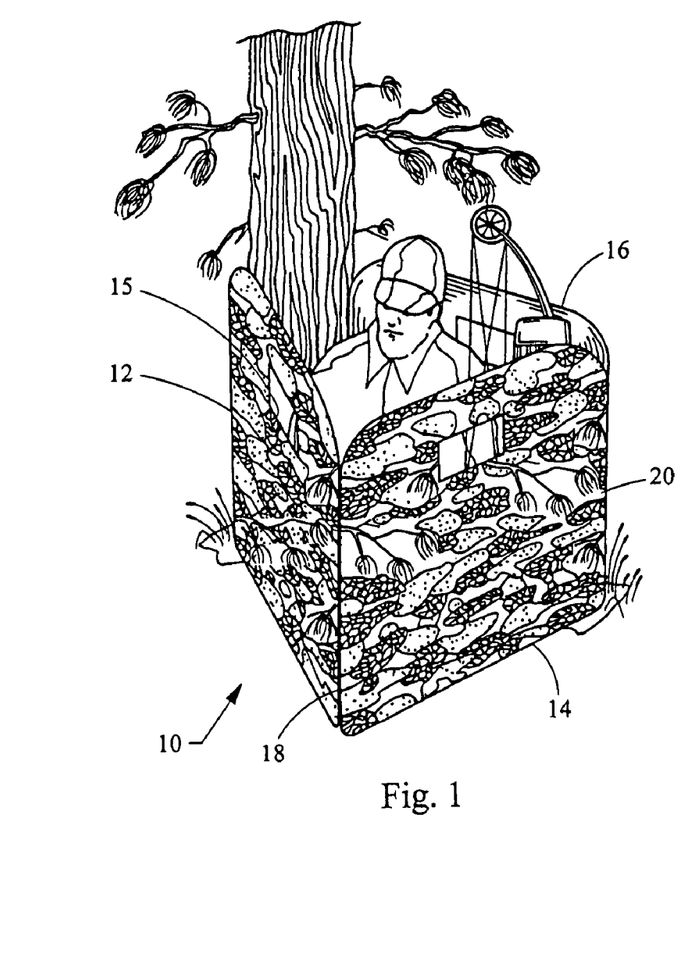
FIG. 1 is a perspective view of a portable hunting enclosure in accordance with a first embodiment of the present invention.

Referring now to FIG. 1, a portable enclosure, in accordance with a first embodiment of the invention for use in helping to conceal a hunter or naturalist, is shown generally at 10.

The enclosure 10 in provided as a portable structure, which is easily assembled in the field to provide concealing cover to a user thereof. The enclosure 10 in this first example includes three panels 12, 14 and 16 pivotally joined together in a sequence. Each of the panels 12, 14, 16 includes a wall 20, reinforced by a support frame 18. The support frame 18 may be made of flexible fiberglass or plastic material. Each panel 12,14,16 further has a window aperture 15 formed therein.

Figure 2A:
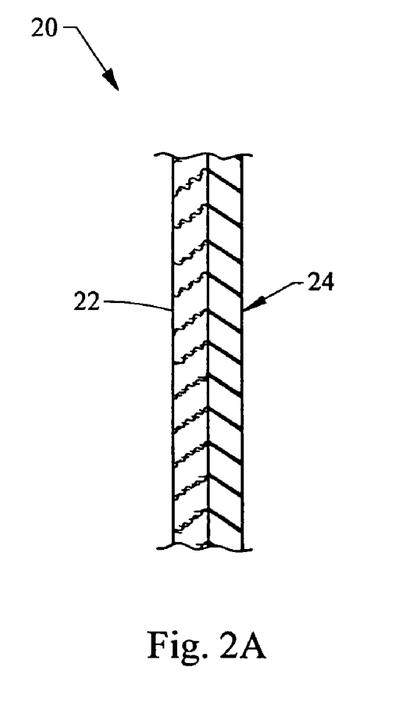
FIG. 2A is a cross-sectional detail view showing a first possible construction of a wall portion of the hunting enclosure of FIG. 1.
Figure 3:
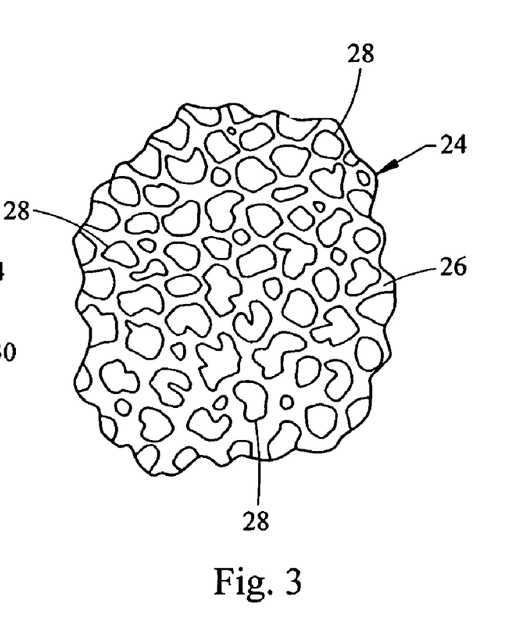
FIG. 3 is a cut away detail plan view of a portion of a liner, which is part of the wall structure of FIG. 2A, 2B or 2C.

As seen in FIGS. 2A and 3, in this first embodiment, the panel wall 20 includes a fabric 22 for placement facing outwardly at the exterior of the enclosure 10. The fabric 22 is preferably printed or otherwise decorated on the outer surface thereof with an outdoor theme or other camouflage pattern, to help it blend in with the natural surroundings in an outdoor environment. The fabric selected may be nylon or may be other durable and weather-tolerant material.

The panel wall 20 also includes a carbonaceous liner 24, which has been painted, sprayed or otherwise directly bonded on to the inner surface of the fabric 22. The liner 24 includes a flexible binder material 26 (FIG. 3) and a multiplicity of carbon particles 28 dispersed within the binder. The binder is preferred to be a flexible material for applications to a fabric 22 and may include an elastomer, which may be a polyacrylate, a polyurethane, a polyolefin, or other suitable binder known in the art. In a preferred embodiment, the carbon particles 28 are finely divided or pulverulent activated carbon. The carbon particles 28 are irregularly shaped, and are preferred to be an average size in a range between 0.01 and 5 mm in diameter.

The carbon particles 28 of the lining tend to dampen or absorb the scent of a human in the enclosure 10, thereby reducing the likelihood that the human's presence will be detected by game animals or other prey. This will contribute to a more successful hunting or other outdoor experience.

Alternate Liner Construction

Figure 2B:
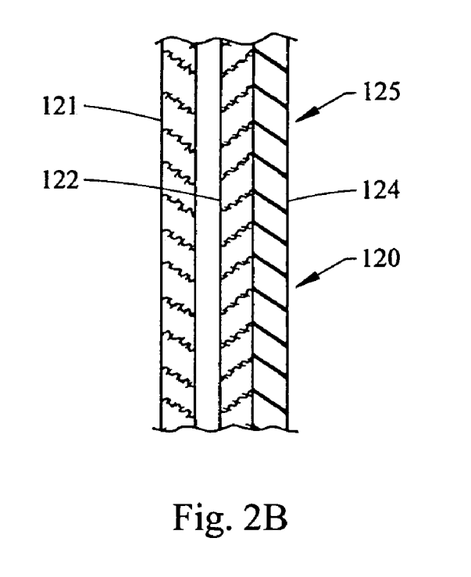
FIG. 2B is a cross-sectional detail view showing a second possible construction of a wall portion of the hunting enclosure of FIG. 1.

An alternative construction of a panel wall 120 is shown in FIG. 2B. In this alternate embodiment, a first fabric section 121 makes up the exterior surface of the panel 120. Once again, the first fabric section 121 of the panel 120 is preferred to be printed or otherwise decorated on the outwardly facing surface thereof with an outdoor theme or other camouflage pattern, to help it blend in with the natural surroundings in an outdoor environment. A second fabric section 122 is separately attached to the first fabric section 121 to carry a carbonaceous separate liner 124. Together, the separate fabric section 122 and liner 124 define a composite scent-dampening sheet 125. Holes may be formed in appropriate portions, as needed; to allow interior access to apertures formed in the first fabric section, such as windows, doors, and the like.

Where the composite scent-dampening sheet and its separate liner 124 is used, it may be sewn on to the first fabric section 121 or, alternatively, may be removably attached thereto using hook and loop fasteners such as VELCRO®. The carbonaceous separate liner 124 is bonded or sprayed on to the inner surface of the second fabric section 122. The separate liner 124 is constructed substantially the same as the first embodiment, that is, the liner includes a binder 26 (FIG. 3) and a multiplicity of carbon particles 28 dispersed within the binder. The binder 26 is preferred to be a flexible material for applications to a flexible fabric 122 and may include a polyacrylate, polyurethane, a polyolefin, or other suitable binder known in the art. In a preferred embodiment, the carbon particles 28 are finely divided or pulverulent activated carbon. The carbon particles 28 are irregularly shaped, and are preferred to be of an average size in a range between 0.01 and 5 mm in diameter.

It is not required for every panel of the enclosure to have a carbonaceous lining to conform to the present invention, although the present invention encompasses the use of a liner on every panel for maximum scent-dampening effect. An enclosure 10 which includes even a single wall panel such as 12, having a carbonaceous directly bonded lining 24 on an inwardly facing surface thereof, will provide some improved scent dampening effect, in comparison to an unlined enclosure.

Second Enclosure Option

Figure 4:
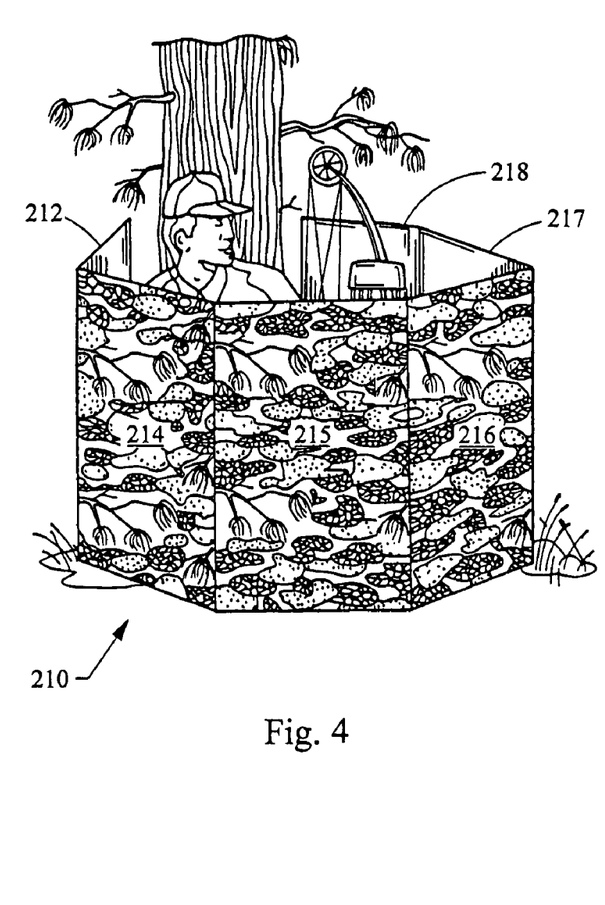
FIG. 4 is a perspective view of a portable hunting enclosure in accordance with a second embodiment of the present invention.

Referring now to FIG. 4, an alternate enclosure in accordance with a second embodiment of the present invention is shown generally at 210. The enclosure 210 in this embodiment is similar to the enclosure 10 of the first embodiment, except that in the second embodiment, the enclosure 210 includes six sequentially interconnected panels 212, 214, 215, 216, 217 and 218, respectively. Other numbers of panels, such as four, five, or seven panels could alternatively be used. One or more of the panels in this embodiment is coated with a carbonaceous lining, substantially similar to that shown and described in connection with FIGS. 2–3.

Third Enclosure Option

Figure 5:
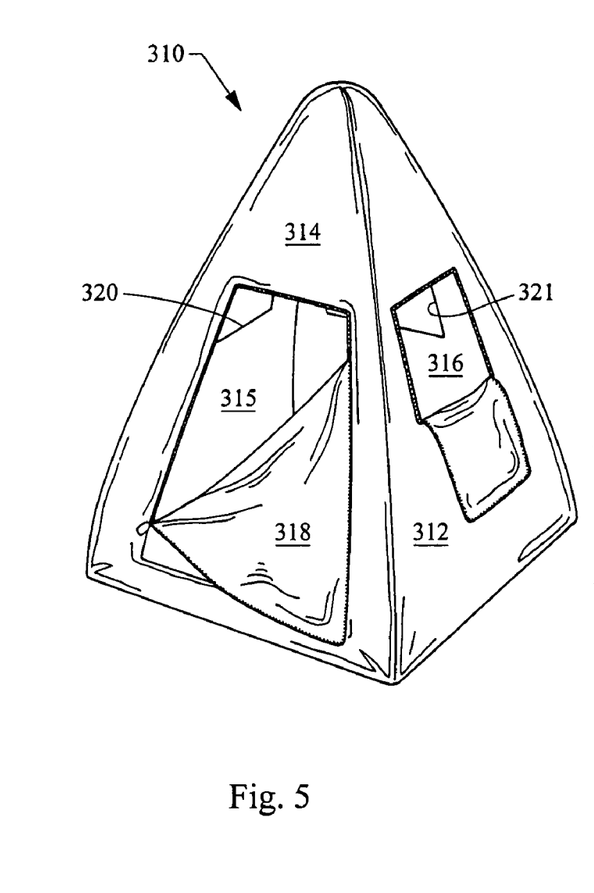
FIG. 5 is a perspective view of a portable hunting enclosure in accordance with a third embodiment of the present invention.

Referring now to FIG. 5, another alternate enclosure in accordance with a third embodiment of the present invention is shown generally at 310. The enclosure 310 in this embodiment includes four substantially triangular panels 312, 314, 315, and 316, respectively, sewn together to form a pointed dome shape, with a zippered entrance door 318 in one of the panels 314. Windows 320 and openings 321 for extending a weapon outwardly from the enclosure 310 are also provided in the structure thereof.

Fiberglass or other resiliently flexible poles (not shown) may be used, in conventional fashion, in tubular sleeves formed at the junction seams of the panels to provide a support structure for the enclosure 310. Alternatively, rigid tent poles may be used.

An interior surface of one or more of the panels 312, 314, 315, and 316 in this embodiment is coated with a carbonaceous lining, substantially similar to that shown and described in connection with FIGS. 2–3.

Fourth Enclosure Option

Figure 6:
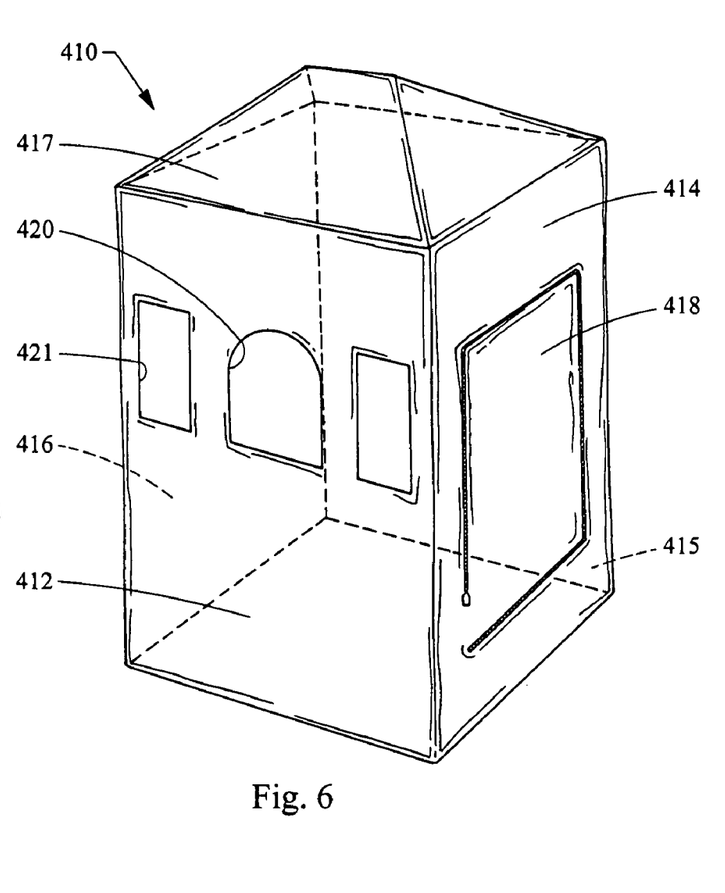
FIG. 6 is a perspective view of a portable hunting enclosure in accordance with a fourth embodiment of the present invention.

Referring now to FIG. 6, a further alternate enclosure in accordance with a fourth embodiment of the present invention is shown generally at 410. The enclosure 410 in this embodiment includes four substantially rectangular panels 412, 414, 415, and 416, respectively, sewn together to form a box shape, with a zippered entrance door 418 in one of the panels 414. A roof 417 is attached in covering relation to the base formed from the panels 412, 414, 415, and 416. Any conventional support structure, such as tent poles or the like (not shown) may be used to support the enclosure 410.

Windows 420 and openings 421 for extending a weapon outwardly from the enclosure 410 are also provided in the structure thereof. An interior surface of one or more of the panels 412, 414, 415, and 416 in this embodiment is coated with a carbonaceous lining, substantially similar to that shown and described in connection with FIGS. 2–3.

Fifth Enclosure Option

Figure 7:
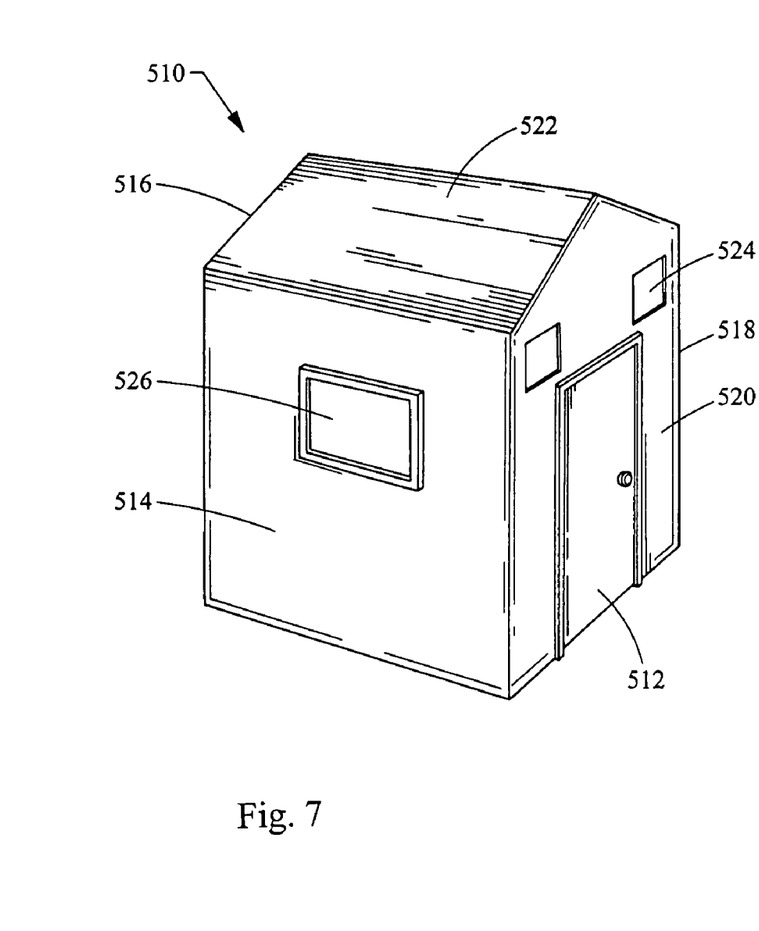
FIG. 7 is a perspective view of a portable hunting enclosure in accordance with a fifth embodiment of the present invention.

Referring now to FIG. 7, a further alternate enclosure in accordance with a fifth embodiment of the present invention is shown generally at 510. The enclosure 510 in this embodiment includes four substantially solid, rectangular walls 514, 516, 518, and 520, respectively, nailed or otherwise joined together to form a box shape, with a hinged entrance door 512 in one of the walls 520. A roof 522 is attached in covering relation to the base formed from the solid walls 514, 516, 518, and 520. Windows 524 and openings 526 for extending a weapon outwardly from the enclosure 510 are also provided in the structure thereof. One or more of the walls 514, 516, 518, and 520, in this embodiment is coated with a carbonaceous lining, substantially similar to that shown and described in connection with FIGS. 2–3.

The liner may be directly spray-coated or otherwise painted on to one or more inner surfaces of the enclosure 510, in a manner similar to that shown and discussed in connection with FIGS. 2A and 3.

Figure 2C:
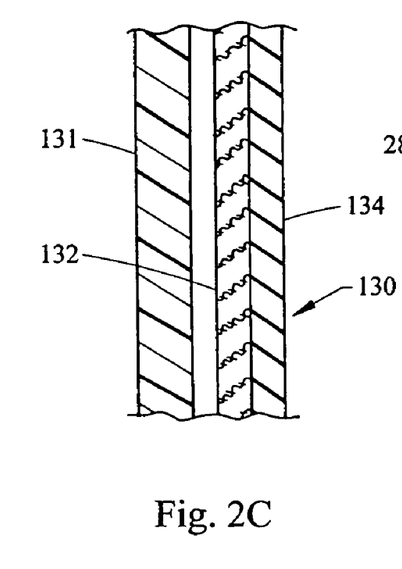
FIG. 2C is a cross-sectional detail view showing a third possible construction of a wall portion of the hunting enclosure of FIG. 7.

An alternative construction for the solid wall 520 is shown in FIG. 2C. In this alternate embodiment, a solid wall section 131 makes up the exterior surface of 520. A fabric section 132 is separately attached to the solid wall section 131 to carry a carbonaceous liner 134. The liner 134 includes a binder and a multiplicity of carbon particles suspended and dispersed throughout the binder as discussed herein in connection with the previous embodiments.

Sixth Enclosure Option

Figure 8:
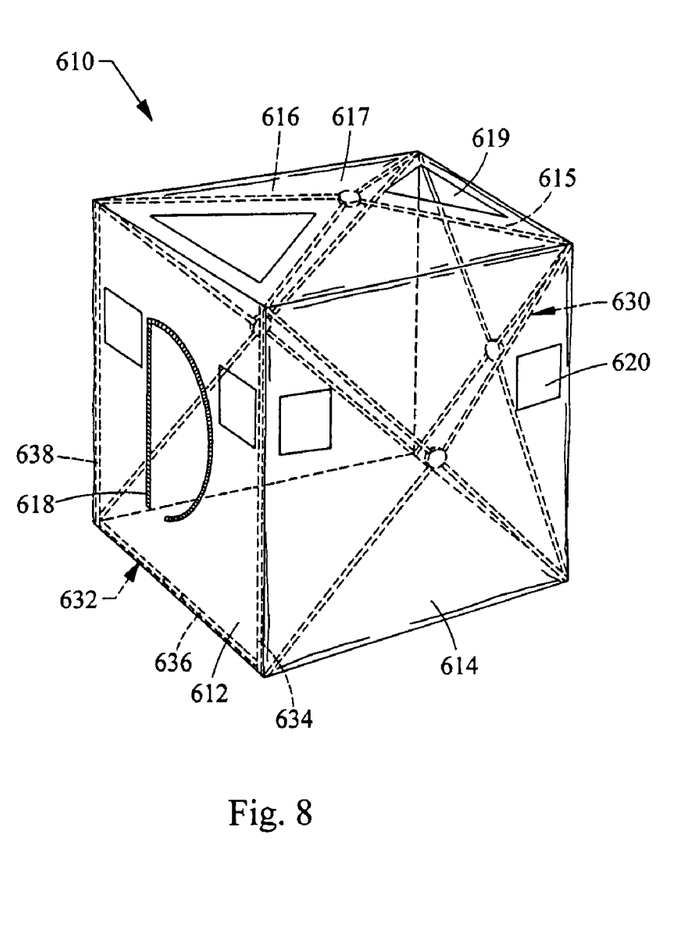
FIG. 8 is a perspective view of a portable hunting enclosure in accordance with a sixth embodiment of the present invention.

Referring now to FIG. 8, a further alternate enclosure, in accordance with a sixth embodiment of the present invention, is shown generally at 610. The enclosure 610 in this embodiment includes four substantially rectangular panels 612, 614, 615, and 616, respectively, sewn together to form a box shape, with a zippered entrance door 618 formed in one of the panels 612, which will be referred to herein as the door panel.

Windows 620, which provide openings for extending a weapon outwardly from the enclosure 610 are also provided in the structure of the wall panels.

A roof panel 617 is attached in covering relation to the base formed from the panels 612, 614, 615, and 616. Optionally, the roof panel 617 may have one or more zippered vent openings 619 formed therein.

In this embodiment of a portable outdoor enclosure 610, foldably collapsible X-shaped subframe assemblies 630 support the roof panel 617 and three of the sidewall panels 614, 615 and 616 in the assembled configuration. These subframe assemblies are substantially identical to the subframe assemblies shown and described in U.S. Pat. No. 3,810,482. The disclosure and drawings of U.S. Pat. No. 3,810,482 are hereby incorporated by reference.

In order to provide access space to allow a user of the enclosure 610 to enter through the door panel 612 when the door 618 is open, a different support structure 632 than that used for the other panels is to support the door panel. The door panel support structure 632 includes three pole members 634, 636, and 638 which are pivotally connected to one another and which may be opened to form substantially a U-shape in the unfolded configuration thereof.

One or more of the wall panels 612, 614, 615, and 616 and/or the roof panel 617 in this embodiment is coated with a carbonaceous lining, substantially similar to that shown and described in connection with FIGS. 2–3. The lining includes a binder material and a multiplicity of carbon particles interspersed and suspended in the binder material. The carbonaceous lining may be bonded directly to a fabric wall or roof panel on the interior surface thereof as shown in FIG. 2A, or alternatively, may be bonded to a separate piece of fabric material which is attached to an inner wall surface of the panel, as shown in FIG. 2B. Where separate fabric material is used to carry the liner, it may be sewn on to the outer layer of fabric, or may be attached thereto using a hook-and-loop fastener such as that sold under the trademark VELCRO.

It will be understood from the foregoing examples that a hunting blind or enclosure in accordance with the invention may be provided in a wide assortment of shapes and sizes, so long as at least part of the interior thereof has a carbonaceous liner therein to dampen the scent of occupants.

Although the present invention has been described herein with respect to a number of preferred embodiments thereof, the foregoing description is intended to be illustrative, and not restrictive. Those skilled in the art will realize that many modifications of the preferred embodiments could be made which would be operable. All such modifications, which are within the scope of the claims, are intended to be within the scope and spirit of the present invention.

What is claimed is:

1. A portable enclosure for temporarily concealing a hunter or naturalist, said enclosure comprising:
   at least one wall comprising a flexible fabric material; and
   a scent-dampening lining material disposed on a surface of said wall;
   wherein said lining material comprises a binder and a multiplicity of carbon particles interspersed in the binder.

2. The enclosure of claim 1, wherein the enclosure comprises a plurality of panel sections pivotally connected in a sequence.

3. The enclosure of claim 1, wherein the binder comprises a polymer selected from the group consisting of polyacrylates, polyurethanes, polyolefins, and mixtures thereof.

4. The enclosure of claim 1, wherein the lining material is attached to an inner surface of the wall, and is substantially uncovered and open to air inside the enclosure.

5. The enclosure of claim 1, wherein the lining material is attached to fabric material which is separate from, and which is attached to an inner surface of the wall.

6. The enclosure of claim 1, wherein in the carbon particle size ranges between 0.01 mm and 5 mm in diameter.

7. The enclosure of claim 1, comprising four substantially triangular fabric wall panels sewn together to form a pointed dome shape, wherein one of the wall panels comprises a zippered entrance door therein.

8. The enclosure of claim 1, comprising four substantially rectangular fabric wall panels sewn together to form a box shape, and a flexible roof panel, wherein one of the wall panels comprises a zippered entrance door therein.

9. The enclosure of claim 1, wherein the lining material is substantially uncovered and open to air inside the enclosure.

10. A portable enclosure, comprising:
   at least four interconnected wall sections;
   door means for allowing a user entry into, and egress from said enclosure;
   a roof attached to at least two of said wall sections; and
   a lining material disposed on an interior surface of at least one of said wall sections or on said roof;
   wherein said lining material comprises a binder and a multiplicity of carbon particles interspersed in the binder.

11. The enclosure of claim 10, wherein the binder comprises a polymer selected from the group consisting of polyacrylates, polyurethanes, polyolefins, and mixtures thereof.

12. The enclosure of claim 10, wherein the lining material is directly attached to an inner surface of the wall.

13. The enclosure of claim 10, where in the lining material is attached to a fabric material which is attached to an inner surface of the wall.

14. The enclosure of claim 10, wherein said wall sections comprise a rigid material.

15. The enclosure of claim 10, wherein the carbon particle size ranges between 0.01 mm and 5 mm in diameter.

16. The enclosure of claim 10, further comprising four foldably collapsible X-shaped subframe assemblies and one foldably collapsible U-shaped support structure;
wherein the roof panel is formed of a flexible material, and wherein the roof panel and three of the wall panels are supported in the assembled configuration by foldably collapsible X-shaped subframe assemblies;
wherein the door means comprises a zipper attached to one of said wall panels;
and wherein the wall panel having the door means attached thereto is supported by said U-shaped support structure.

17. A portable enclosure, comprising:
at least four interconnected wall sections;
door means for allowing a user entry into, and egress from said enclosure;
a roof attached to at least two of said wall sections; and
a lining material disposed on an interior surface of at least one of said wall sections or on said roof;
four foldably collapsible X-shaped subframe assemblies and one foldably collapsible U-shaped support structure;
wherein the roof panel is formed of a flexible material, and wherein the roof panel and three of the wall panels are supported in the assembled configuration by foldably collapsible X-shaped subframe assemblies;
wherein the door means comprises a zipper attached to one of said wall panels;
and wherein the wall panel having the door means attached thereto is supported by said U-shaped support structure;
wherein said lining material comprises a binder and a multiplicity of carbon particles interspersed in the binder;
and further wherein said foldably collapsible U-shaped support structure comprises three pole members which are pivotally connected to one another.

18. A portable enclosure for temporarily concealing a hunter or naturalist, said enclosure comprising:
at least one wall section comprising a flexible fabric material;
a closable entryway for allowing a user entry into, and egress from said enclosure; and
a scent-dampening liner disposed on an interior surface of said at least one wall section.

19. The enclosure of claim 16, wherein each of said interconnected wall sections comprises a flexible fabric material.

20. A portable enclosure for temporarily concealing a hunter or naturalist, said enclosure comprising:
a plurality of interconnected wall sections;
a closable entryway for allowing a user entry into, and egress from said enclosure; and
a composite scent-dampening sheet disposed on an interior surface of at least one of said wall sections;
wherein said scent-dampening sheet comprises:
at least one sheet of flexible fabric material, and
a scent-dampening material operatively associated with said sheet of flexible fabric.

21. A portable enclosure for temporarily concealing a hunter or naturalist, said enclosure comprising:
a plurality of interconnected wall sections;
a closable door for allowing a user entry into, and egress from said enclosure; and
a scent-dampening liner disposed on an interior surface of at least one of said wall sections;
wherein said liner comprises a multiplicity of carbon particles, and a flexible binder for keeping said carbon particles together.

22. A portable enclosure for temporarily concealing a hunter or naturalist, said enclosure comprising:
a plurality of interconnected wall sections;
closable door means for allowing a user entry into, and egress from said enclosure; and
a composite scent-dampening sheet disposed on an interior surface of at least one of said wall sections;
wherein said scent-dampening sheet comprises:
at least one sheet of flexible fabric material, and
a liner, comprising a multiplicity of carbon particles and a flexible binder for keeping said carbon particles in place on said fabric material.

* * * * *

UNITED STATES PATENT AND TRADEMARK OFFICE
CERTIFICATE OF CORRECTION

PATENT NO. : 6,941,961 B1
DATED : September 13, 2005
INVENTOR(S) : Eastman II

It is certified that error appears in the above-identified patent and that said Letters Patent is hereby corrected as shown below:

Column 1,
Line 59, change "material, which has" to -- material, which have --.
Line 60, change "features, is known," to -- features, are known, --.
Line 61, change "5,539,930, 5,585,107, 5,678,247, 5,891,391" to -- 5,539,930; 5,585,107; 5,678,247; 5,891,391; --.

Column 3,
Line 8, change "enclosure 10 in provided" to -- enclosure 10 is provided --.
Line 27, change "bonded on to" to -- bonded to --.
Line 36, change "preferred to be an average" to -- preferred to be of an average --.

Column 4,
Line 17, change "scent dampening effect" to -- scent-dampening effect --.

Column 5,
Line 57, change "different support structure 632 than that" to -- different support structure 632 from that --.

Column 6,
Line 10, change "mark VELCRO." to -- mark VELCRO$^{®}$ . --.
Line 44, change "is attached to an inner" to -- is attached to, an inner --.
Line 45, change "wherein in the carbon" to -- wherein the carbon --.

UNITED STATES PATENT AND TRADEMARK OFFICE
CERTIFICATE OF CORRECTION

PATENT NO. : 6,941,961 B1
DATED : September 13, 2005
INVENTOR(S) : Eastman II

It is certified that error appears in the above-identified patent and that said Letters Patent is hereby corrected as shown below:

Column 7,
Line 7, change "claim 10, where in" to -- claim 10, wherein --.

Column 8,
Line 9, change "The enclosure of claim 16," to -- The enclosure of claim 21, --.

Signed and Sealed this

Twenty-fifth Day of April, 2006

JON W. DUDAS
*Director of the United States Patent and Trademark Office*